US007757620B1

(12) United States Patent
French

(10) Patent No.: US 7,757,620 B1
(45) Date of Patent: Jul. 20, 2010

(54) GARDEN TOOL AND SEED DRILL FOR USE THEREWITH

(76) Inventor: Michael J. French, 3442 E. 100 North, Rigby, ID (US) 83442

( * ) Notice: Subject to any disclaimer, the term of this patent is extended or adjusted under 35 U.S.C. 154(b) by 266 days.

(21) Appl. No.: 11/717,577

(22) Filed: Mar. 12, 2007

Related U.S. Application Data

(60) Provisional application No. 60/781,087, filed on Mar. 10, 2006.

(51) Int. Cl.
*A01B 1/00* (2006.01)
*A01B 33/00* (2006.01)
*A01B 45/00* (2006.01)
*A01B 45/02* (2006.01)
*A01C 5/00* (2006.01)

(52) U.S. Cl. ............................ 111/52; 111/90; 111/91; 111/95; 172/21; 172/37

(58) Field of Classification Search .................. 111/52, 111/89–95; 172/21, 37, 111
See application file for complete search history.

(56) References Cited

U.S. PATENT DOCUMENTS 2,543,888 A * 3/1951 Bunch ......................... 111/91
2,975,735 A * 3/1961 Purvance .................... 111/128
3,621,920 A * 11/1971 Brown ......................... 172/21
3,945,176 A 3/1976 Vicendese et al.
3,951,306 A 4/1976 Ernst
3,971,446 A 7/1976 Nienberg
4,030,428 A 6/1977 Truax
4,078,504 A 3/1978 Tye
4,165,697 A 8/1979 Yeager et al.
4,166,351 A 9/1979 Nienberg
4,192,387 A 3/1980 Stinson
4,213,504 A 7/1980 Schneider
4,244,308 A 1/1981 Vince
4,259,912 A 4/1981 Stocks
4,261,270 A * 4/1981 Nichols ....................... 111/89
4,275,670 A 6/1981 Dreyer
4,361,191 A 11/1982 Landoll et al.
4,473,016 A 9/1984 Gust
4,480,765 A 11/1984 Tonus
4,532,725 A 8/1985 Trejo et al.
4,564,072 A 1/1986 Corbett
4,616,714 A * 10/1986 Lister .......................... 172/21
4,646,939 A 3/1987 Herriau (Continued)

*Primary Examiner*—Christopher J. Novosad
(74) *Attorney, Agent, or Firm*—Thorpe North & Western LLP

(57) ABSTRACT

A garden machine allows a user to perform various gardening functions with a single machine by allowing the user to easily interchange implements placed on an implement mounting shaft of the machine. The garden machine includes a frame and an implement mounting shaft. The user, faced with a job to do, selects the implements best suited for the job and mounts the selected implements on the implement mounting shaft. The user then manipulates the machine to do the job. The machine can be hand powered or be powered by an engine or motor. A seed drill of the invention includes seed discharge tubes spaced around the circumference of a disk. Each seed discharge tube communicates with a seed reservoir in the disk through a displacement operated valve arrangement. As a planting head is displaced toward the disk against a spring bias, the displacement opens the seed discharge tube so that a seed is discharged from the reservoir into the tube and is delivered to the ground.

14 Claims, 8 Drawing Sheets

86 100 102 110 104 112 108 87 106 90 106 112 108 104 110 102 100 28 24 87

U.S. PATENT DOCUMENTS 4,765,263 A 8/1988 Wilkins
4,785,890 A 11/1988 Martin
4,813,175 A 3/1989 Meyer
4,913,070 A 4/1990 Morrison, Jr.
5,022,333 A 6/1991 McClure et al.
5,435,396 A 7/1995 Robichaux
5,595,130 A 1/1997 Baugher et al.
5,626,196 A 5/1997 Hughes
5,802,995 A 9/1998 Baugher et al.
5,810,093 A * 9/1998 Howard ...................... 172/111
5,960,889 A * 10/1999 McLaren ..................... 172/37
5,974,987 A 11/1999 Langbakk
6,189,627 B1 2/2001 Marshall et al.
6,216,616 B1 4/2001 Bourgault et al.
6,340,061 B2 1/2002 Marshall et al.
6,643,959 B2 11/2003 Jolliff et al.
6,745,709 B2 6/2004 Rowlett et al.
6,941,739 B1 9/2005 Gliser

* cited by examiner

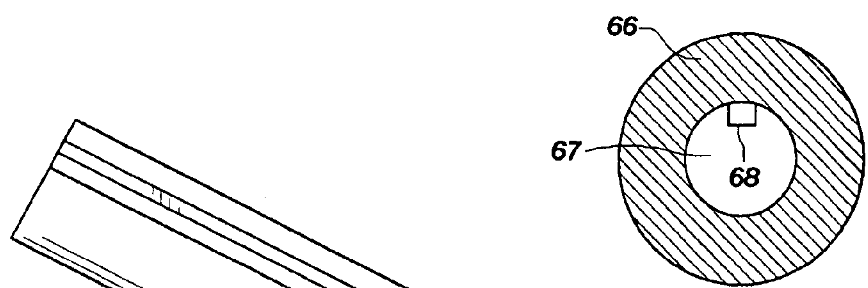
FIG. 6
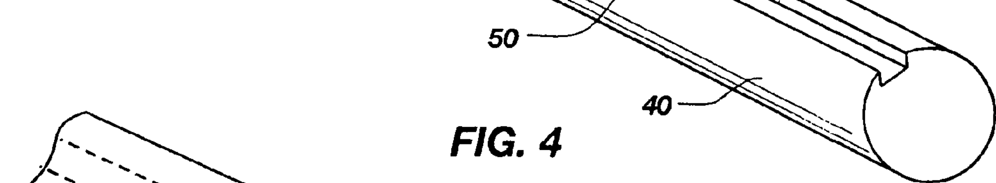
FIG. 4
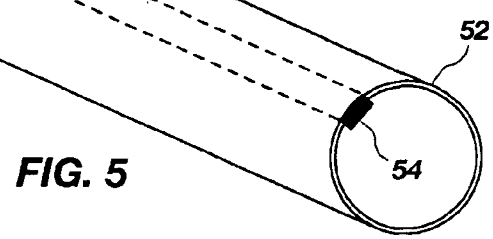
FIG. 5
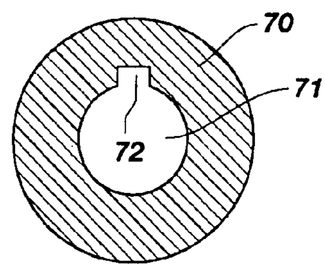
FIG. 7
FIG. 8
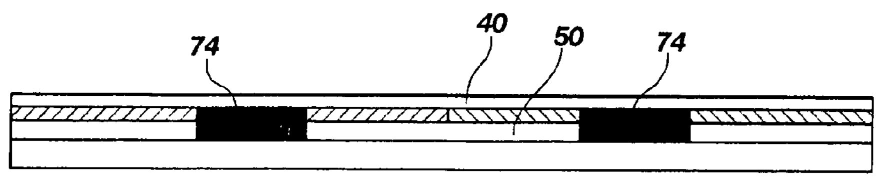
FIG. 9

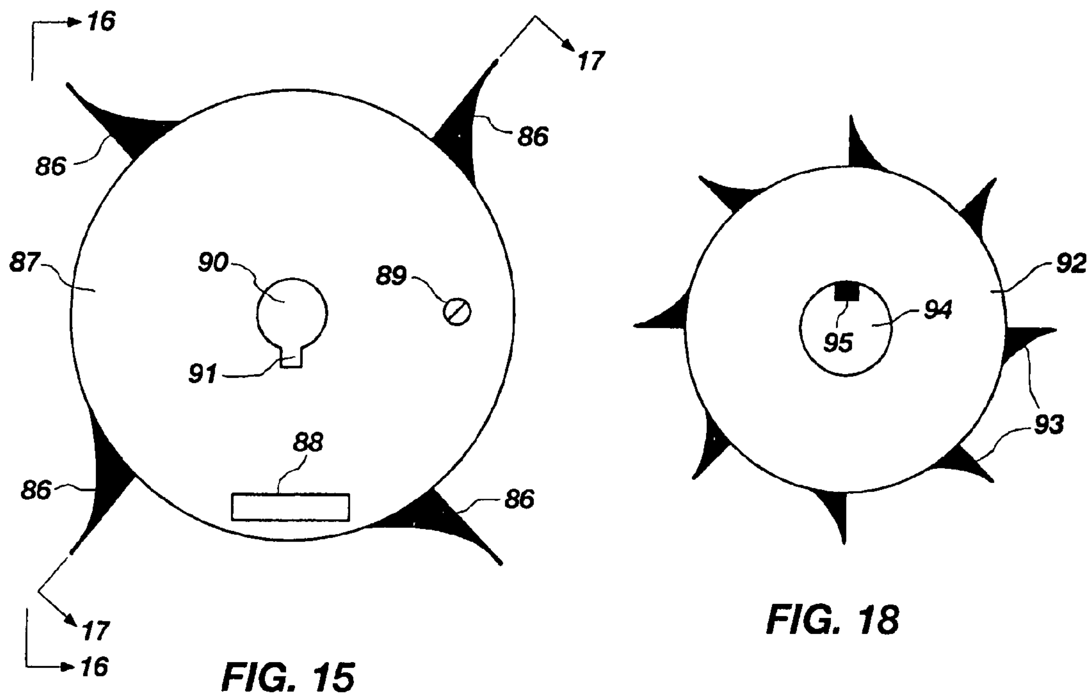
FIG. 15
FIG. 18
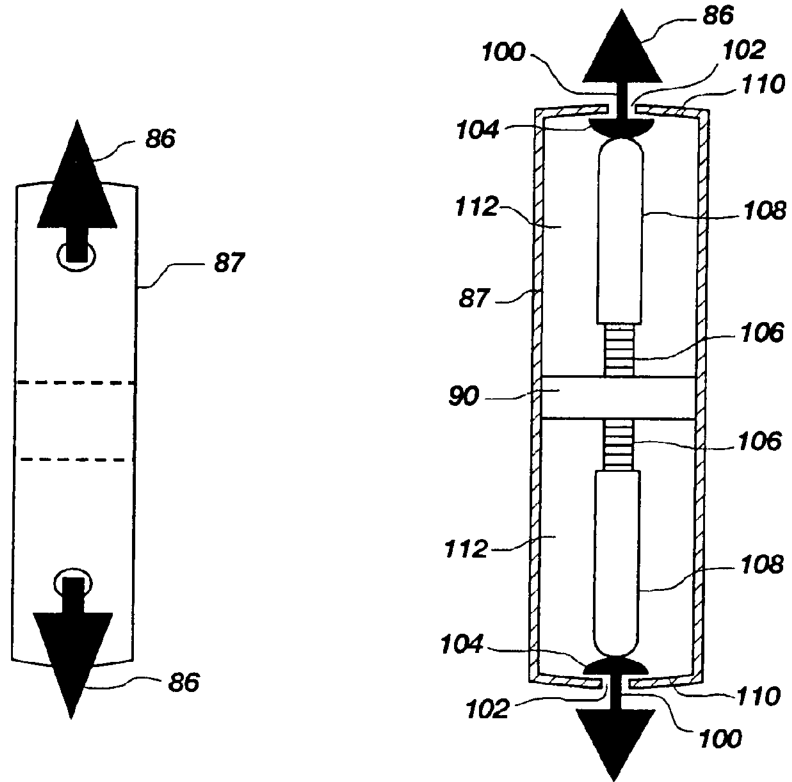
FIG. 16
FIG. 17

GARDEN TOOL AND SEED DRILL FOR USE THEREWITH

RELATED APPLICATIONS

Priority of Provisional Patent Application Ser. No. 60/781,087, filed on Mar. 10, 2006, is claimed.

BACKGROUND OF THE INVENTION

1. Field

The invention is in the field of hand powered or motor driven garden tools wherein the tool is adapted to have different implements attached thereto to perform different cultivating and planting functions in a garden.

2. State of the Art

There are many tools currently available for helping gardeners perform gardening functions in a garden. For example, there are various motor driven tillers available for tilling the garden soil, aerators for aerating gardens and lawns, and tillers and seeders for tilling and planting farm fields. While some tillers have detachable tilling disks which can be attached to the tiller side-by-side in a desired number to provide a narrow or wider width of tilling, such machines are generally designed for single functions, i.e., a tiller is used only for tilling. U.S. Pat. No. 4,192,387 shows a tiller where the tiller blades can be replaced with cylindrical tiller drums which can perform tilling, aerating, and soil working functions. U.S. Pat. Nos. 6,941,739 and 6,643,959 show walk behind power units adapted to have various accessory devices attached to the power unit, such as lawn mowers, snow blowers, aerators, etc. U.S. Pat. No. 3,945,176 shows a lawn mower unit with a thatcher and a seeder incorporated therein so that lawn thatching and reseeding takes place along with lawn cutting. U.S. Pat. No. 4,532,725 shows a riding power unit which interchangeably includes a lawn mower, a tiller, and a snow blower. U.S. Pat. Nos. 6,340,061 and 4,213,504 show handheld units to which various tools may be attached for gardening purposes.

While the prior art machines described work for some purposes, there is still a need for a machine which can be hand operated or power driven and which can provide soil preparation and seed planting for gardens.

SUMMARY OF THE INVENTION

According to the invention, a garden machine useful for soil preparation and seeding of gardens includes a frame with a shaft mounted thereto which mounts at least one implement, such as a seed drill for planting seeds, a tiller disk, or tiller blades used to prepare and/or plant a garden. The frame is provided with a handle through which a user can hold and manipulate the frame and attached implements. When the implements are cylindrical like wheels, the frame and machine is supported by such implements and can be pushed or pulled along the ground to be worked by the machine. Wheels can be mounted on the frame to further support the machine during use and to allow easy movement of the machine to a location of use. For movement of the machine between uses, the frame is tipped onto the wheels so that the machine rests on the wheels and the implements are not penetrating the ground. The machine is then rolled on the wheels to the desired location.

In a preferred embodiment of the invention, implements are removably mounted on the shaft for rotation with the shaft. The implements may thus be removed from the shaft and replaced with other implements. For example, one or more tiller blades or disks can be mounted on the shaft and the machine pushed over the ground in the garden to be planted to loosen and break up the soil. For such operation, the tiller disks will generally be oriented at an angle to the shaft and to the ground surface (the shaft is generally oriented parallel to the ground surface). The tiller disks can then be removed from the shaft and replaced with seed drills which are then pushed over the loosened and broken up soil to deposit seeds therein. Alternately, the tiller disks can be used to create furrows for seeds and the seeds can be dispensed from seed discharge tubes in conjunction with the disks. In such instance, usually two tiller disks will be used oriented in a V shape to create each of the furrows for the seeds. Various other implements can be mounted on the shaft to perform various desired functions. The shaft can be removably mounted on the frame so it can be removed from the frame to allow removal of the implements, or can be mounted intermediate the shaft to extend from its mounting to the frame in cantilever fashion to allow removal of the implements from the cantilevered ends of the shaft.

The machine can include a power source, such as a gasoline engine or electric motor coupled to the shaft to cause the shaft and implements mounted thereon to rotate. With a motor mounted on the machine, tiller blades such as used with prior art tiller machines, or a rake implement to form a power rake, can be mounted on the shaft for use in known manner. While traditional tiller blades will pull the machine forward during tilling, the tiller disks and seed drill, particularly in soft soil, may not pull the machine forward requiring the machine to be pushed forwardly. If it is desired to make the machine self propelled, the power source can also be coupled to the wheels on the machine to turn the wheels and propel the machine.

A seed drill of the invention is disk shaped where the disk is cylindrical in shape and includes seed discharge tubes spaced around the circumference of the disk. The seed discharge tubes are cooperable with planting heads, such as spade or shovel heads, which extend from the circumferential surface of the disk. The planting heads are spring loaded so can be pushed against the spring bias a distance toward the circumferential surface of the disk from which they extend. The distance toward the disk can be adjusted so that the planting heads will, when pushed toward the disk, still extend from the surface of the disk a distance about equal to the desired depth of planting of the seed to form a furrow or hole for the seed. Each seed discharge tube communicates with a seed reservoir in the disk through a displacement operated valve arrangement so that as a planting head is displaced toward the disk against the spring bias, the displacement opens the seed discharge tube to the seed reservoir so that a seed is discharged from the reservoir into the tube and is then delivered through the tube to the ground. The planting head is displaced toward the disk in response to the weight of the machine on the planting head as it rolls over the ground surface (but will extend into the ground under the weight of the machine to the extent that it cannot move toward the disk and extends from the disk) and extends to a fully allowed extent from the disk under the spring loading or bias when not against the ground surface. When fully extended, the seed valve is closed so seeds do not enter the seed discharge tube.

In one embodiment of the seed drill, a planting spade or shovel head extends as the planting head from the disk on the end of a spring loaded shaft that extends through a seed discharge opening through the circumferential disk wall. The seed discharge opening serves as the seed discharge tube. The seed discharge opening is larger than the shaft passing therethrough so that a seed can fall through the opening around the shaft. The shaft has a stop or plug mounted thereon inside the disk which, under spring bias, plugs the seed discharge opening and serves as a stop for the outward travel of the shaft under the bias of the spring. The inside of the disk is hollow and forms the seed reservoir. As the spade or shovel head rolls over the ground and causes inward travel of the shaft, the stop or plug is displaced inwardly from the seed discharge opening to uncover it and allow a seed or several seeds from inside the disk to flow by gravity into the seed opening to rest against the top of the spade or shovel head at the other end of the seed discharge opening. As the disk continues to rotate so the spade or shovel head begins to be lifted out of the ground, the spring bias forces the spade or shovel head away from the seed discharge opening to allow the seed or seeds in the opening to fall into the furrow or hole formed by the spade or shovel head thereby planting the seed. The combination of the shovel head, shaft, stop, and spring form the displacement operated valve.

In the alternate seeding operation where the tilling disks are used with the seeder, two tilling disks will be positioned side-by-side angled toward one another in a substantially V configuration so that the two disks cooperate in the ground to form a furrow. A seed bin and seed dispenser is positioned to drop seeds through a seed dispensing tube into the furrow at a preset rate as the machine moves over the ground.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein:

FIG. 4 is a perspective view of an implement shaft of the invention having a keyway therein;

FIG. 5 is a perspective view of a sleeve which fits over the shaft of FIG. 4, and to which various blades or disks can be secured to form an implement;

FIG. 6 is vertical section of one embodiment of an implement disk which can be secured to the shaft of FIG. 4;

FIG. 7 is vertical section of another embodiment of an implement disk which can be secured to the shaft of FIG. 4;

FIG. 8 is a perspective view of a key that can be used with the implement disk of FIG. 7 and the implement shaft of FIG. 4;

FIG. 9 is a top view of the implement shaft of FIG. 4 with keys of FIG. 8 positioned in the keyway thereof;

FIG. 15 is a side elevation of a seed drill of the invention;

FIG. 16 is a end elevation of the seed drill of FIG. 15 taken on the line 16-16 of FIG. 15;

FIG. 17 is a vertical section through the seed drill taken on the line 17-17 of FIG. 15;

FIG. 18 is a side elevation similar to that of FIG. 15, but showing eight seed dispenser rather than four seed dispensers;

DETAILED DESCRIPTION OF THE ILLUSTRATED EMBODIMENTS

Figure 1:
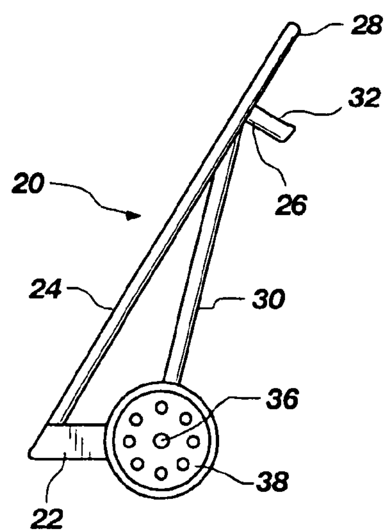
FIG. 1 is a side elevation of an example of a non-powered or hand powered embodiment of a garden machine of the invention.
Figure 2:
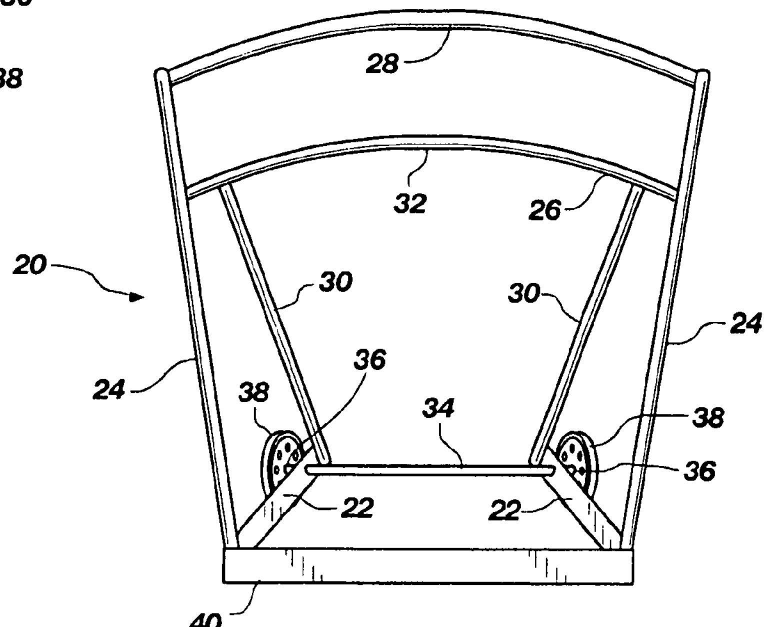
FIG. 2 is a front elevation of the embodiment of FIG. 1.
Figure 3:
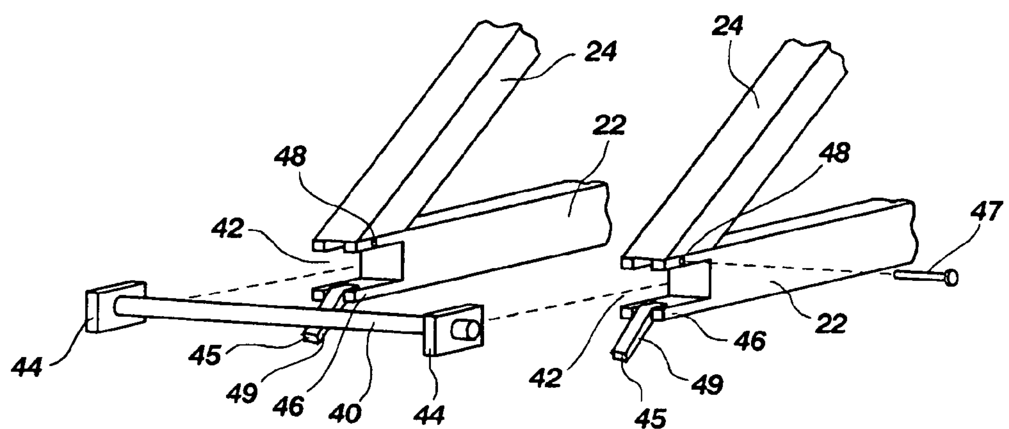
FIG. 3 is a fragmentary perspective view of the lower front portion of the embodiment of FIG. 1 showing an embodiment of a shaft and implement attachment.

A non-powered or hand powered embodiment of the garden machine of the invention is shown in FIGS. 1-3 with a removable shaft for implement placement at the lower front of the machine and wheels at the lower rear of the machine. The hand powered embodiment shown in FIGS. 1-3 includes a frame 20 formed by lower side bars 22 extending rearwardly from attachment, such as by welding, to front upwardly extending frame members 24 which extend upwardly and rearwardly to attachment to upper cross member 26 and to top handle cross member 28. Upwardly extending rear frame members 30 extend between the rear ends of lower side bars 22 and upper cross member 24. The intermediate length of upper cross member 24 between the attachment to rear frame members 30 extends rearwardly to form a lower handle 32. Lower cross member 34 extends between the rear ends of lower side bars 22 and can extend beyond the lower side bars 22 as at 36 to mount wheels 38. Alternately, wheel 38 could be mounted to a shaft extending directly from lower bars 22.

An implement mounting shaft 40 is removably and rotatably mounted at the lower front end of frame 20. In the embodiment shown, the front ends of lower side bars 22 are notched as at 42 to removably receive therein bearings blocks 44. Bearings blocks 44 are held in notches 42 by hinged bars 45 hingedly secured by pins 46 at the bottom front of lower side bars 22. FIG. 3 shows the hinged bars 45 in open position so that bearing blocks 44 can be inserted into notches 42. Hinged bars 45 are held in closed position once bearing blocks 44 are inserted into notches 42 by removable pins 47 inserted through holes 48 through the upper front of side bars 22 and holes 49 through hinged bar 45 when pivoted into closed position, not shown. At least one of the bearing blocks 44 can be easily removed from an end of shaft 40 when removed from frame 20 so that various implements, such as tiller blades or tiller disks, aerating cores, seed drills, etc., can be slide onto and off of implement mounting shaft 40.

Figure 10:
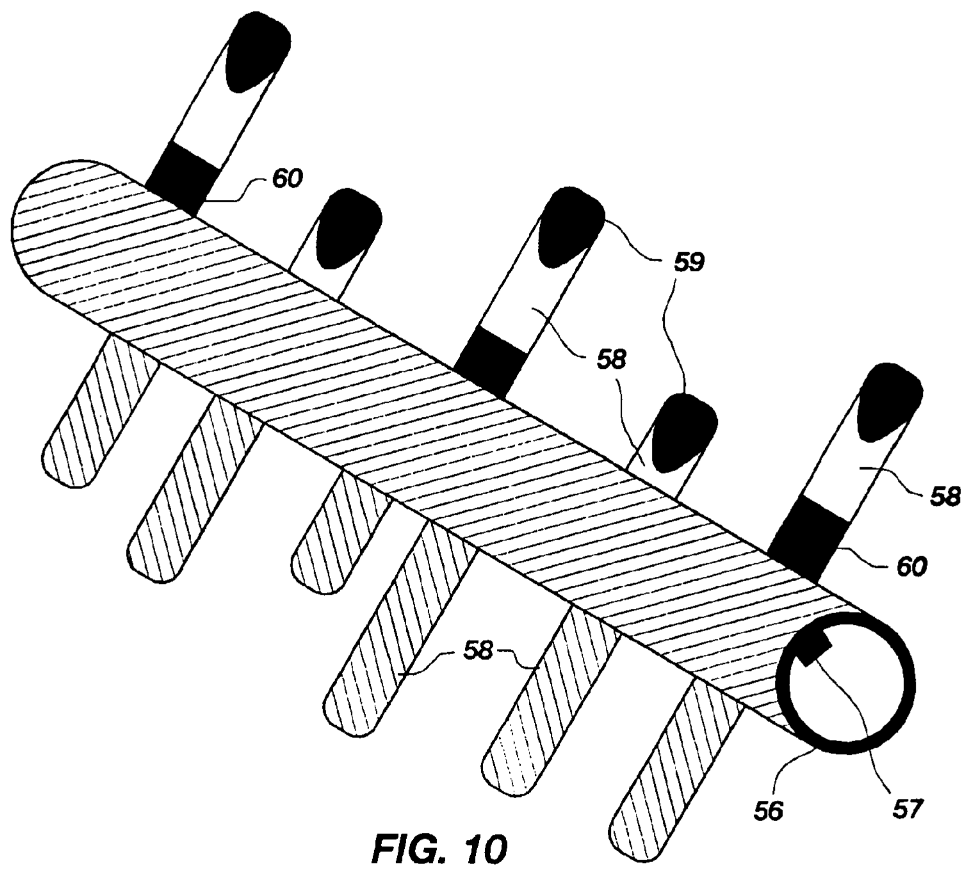
FIG. 10 is a perspective view of an aeration implement for use with the invention.
Figure 11:
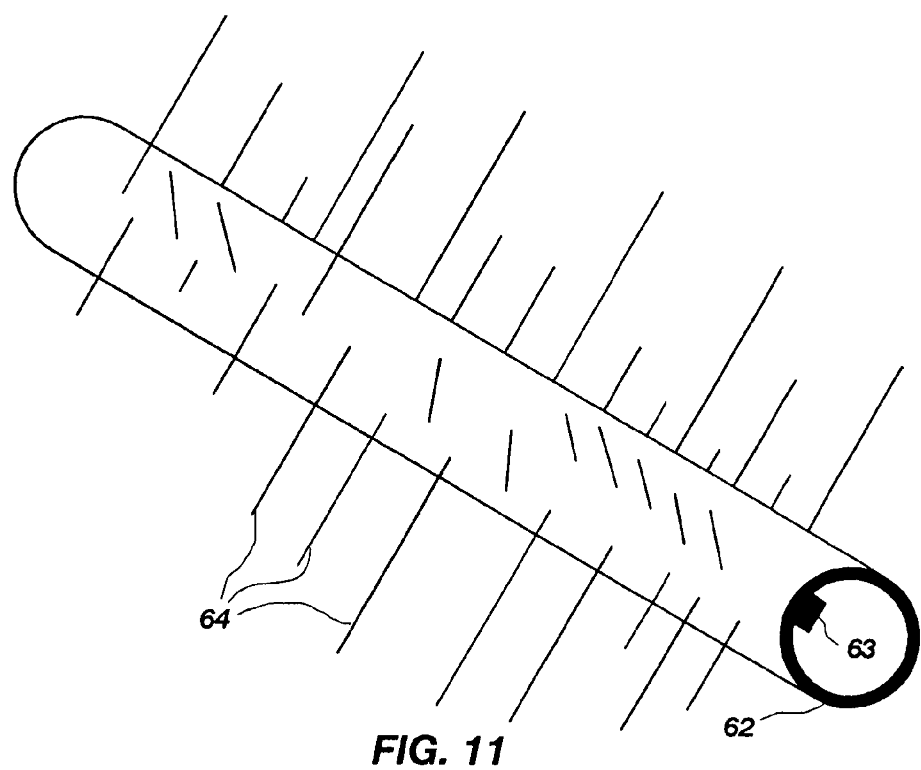
FIG. 11 is a perspective view of a rake implement for use with the invention.

FIG. 4 shows an embodiment of implement mounting shaft 40 wherein the shaft is solid and has a keyway 50 extending the length of the shaft. In this embodiment, implement mounting shaft 40 is configured to removably and interchangeable receive various implements thereon Implements can be mounted on implement mounting shaft 40 in several way. FIG. 5 shows a sleeve 52 sized to fit over shaft 40 and having a key 54 extending inwardly to mate with keyway 50 of shaft 40. When placed over shaft 40 with key 54 in shaft keyway 50, shaft 40 and sleeve 52 will rotate together. Sleeve 52 can have various blades, prongs, disks, aerating cores, etc., secured thereto such as by welding or other means, to form an implement for use with the garden machine. For example, FIG. 10 shows an aerating implement having sleeve 56 with key 57 to fit over shaft 40. Aerating cores 58 are secured, such as by welding, to sleeve 56 and extend outwardly therefrom at a plurality of locations around the sleeve. Cores 58 are hollow and open at their outward ends 59 to cut a core from a lawn or other surface as it rolls over the surface. The core cuttings are pushed through the hollow cores 58 and are forced out of the cores 58 through openings 60 at their ends adjacent sleeve 56. FIG. 11 shows a rake implement having sleeve 62 with key 63 to fit over shaft 40. Rake tines 64 are secured, such as by welding, to sleeve 62 and extend outwardly therefrom at a plurality of locations around the sleeve.

Figure 12:
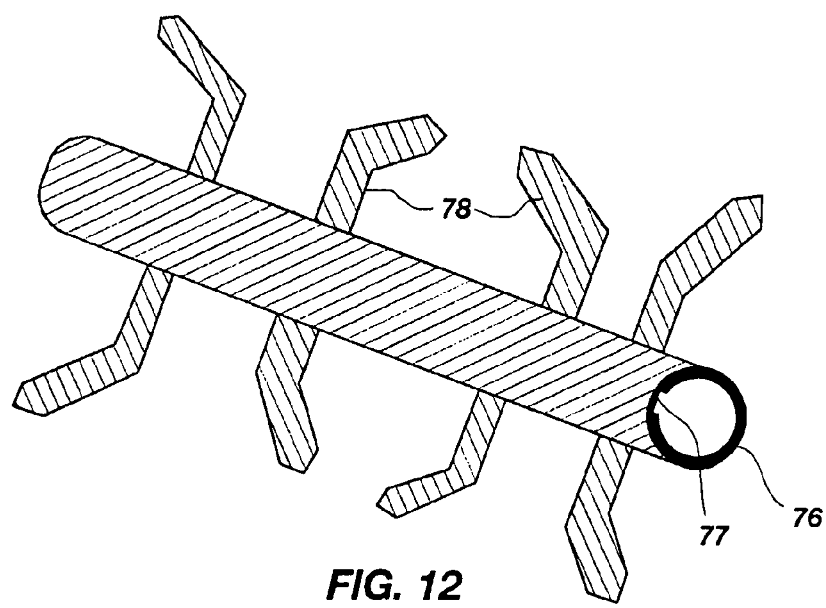
FIG. 12 is a perspective view of a tiller implement for use with the invention.

The sleeve 52 as shown in FIG. 5, and sleeves 56 and 62 in FIGS. 10 and 11 can be of any desired length. The sleeves can be as long as the shaft on which they are to be mounted, or can be any desired fraction of the length of the shaft on which they are to be mounted. For example, each sleeve can be half the length of the shaft so that one implement with the half length sleeve is mounted on shaft 40, and then a second implement with the half length sleeve is also mounted on shaft 40 to provide an implement extending the full length of the shaft. If a shorter implement is desired, only one of the implements with half length sleeve is used. If desired, different implements can be used on the same shaft so that an aeration implement could be placed along one half the length of the shaft and a rake implement can be placed along the other half length of the shaft.

Where a shorter implement, such as a disk or seed drill, or a plurality of shorter implements are to be used, such implements can be mounted directly on the shaft 40 rather than on a sleeve. In such instance, the disk will have a center opening sized to fit on the disk. For example, FIG. 6 shows a disk 66 having a central opening 67 to fit over shaft 40, and includes a key 68 extending into opening 67 to mate with shaft keyway 50 to secure the disk 66 to the shaft. Alternately, as shown in FIG. 7, a disk 70 with central opening 71, can have a keyway 72 extending outwardly therefrom. In such instance, disk 70 is placed on shaft 40, but is free to rotate. However, a separate key 74, FIG. 8, or several keys 54 can be placed in shaft keyway 50, as shown in FIG. 9, in places it is desired to lock a disk to rotate with shaft 40. In such locations, the key 74 will fit into shaft keyway 50 and disk keyway 72 to lock disk 70 to shaft 40. This arrangement can also be used with sleeves as well as disks. Thus, FIG. 12 shows a tiller implement including sleeve 76 with keyway 77 therein. Tiller blades 78 are secured to sleeve 76 and extend outwardly therefrom. A key 74 can be placed in shaft keyway 50 to also extend into sleeve keyway 77 to secure sleeve 76 to shaft 40.

Figure 13:
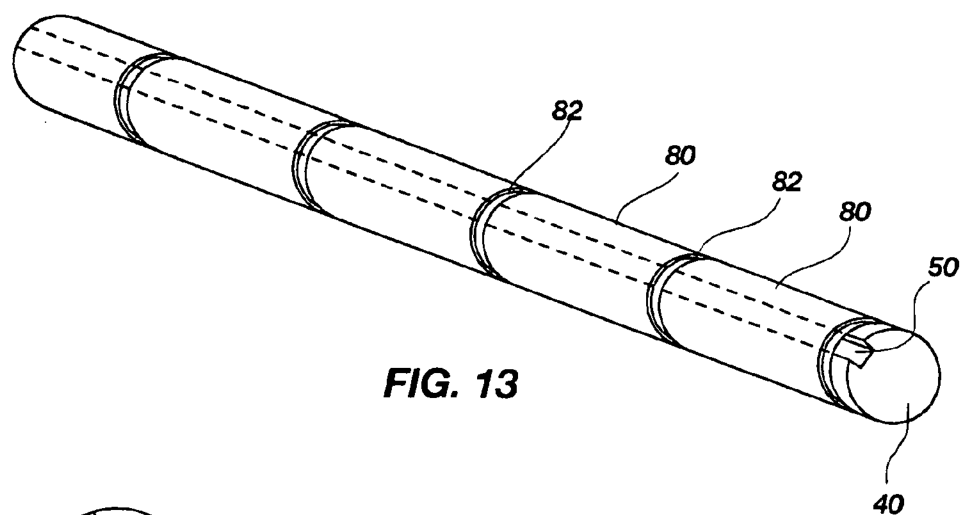
FIG. 13 is a perspective view of an implement shaft of the invention with spacers thereon to space implement disks along the length of the shaft, but not showing any implement disks.
Figure 14:
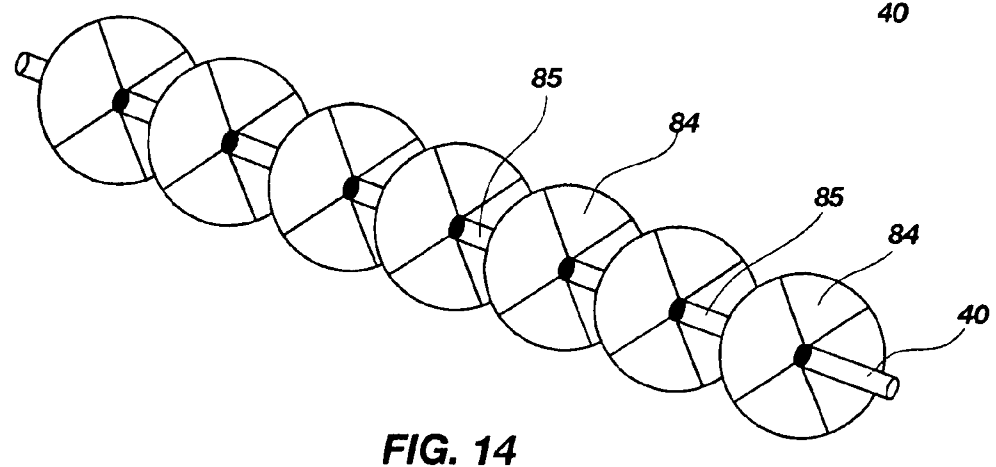
FIG. 14 is a perspective view of a disk tiller or harrow using implement disks spaced along the implement shaft.

When disks are used and placed on shaft 40, the disks can be placed together side-by-side or can be spaced apart. If the disks are to be spaced apart, spacers 80, FIG. 13 can be used between the disks. FIG. 13 shows a shaft 40 with keyway 50 having a plurality of spacers positioned therealong. For explanation purposes, no implement disks are shown in FIG. 13. Spacers 80 are sleeves that fit around shaft 40 so that disks can be positioned between the spacers. As shown in FIG. 13, the disks would be positioned in the spaces 82 between the spacers with the spacers abutting the disks. The sleeves or spacers 80 can have a round interior without a key or keyway so can slip on shaft 40, or can have a key or keyway so can be locked to the shaft 40. FIG. 14 shows an implement with a plurality of tiller disks or harrow blades 84 in the form of round disks. While these disks 84 could be secured, such as by welding to a sleeve to be attached to shaft 40, each disk 84 can individually be mounted on shaft 40 with spacers 85 between each disk to keep them spaced apart a desired distance.

Figure 19:
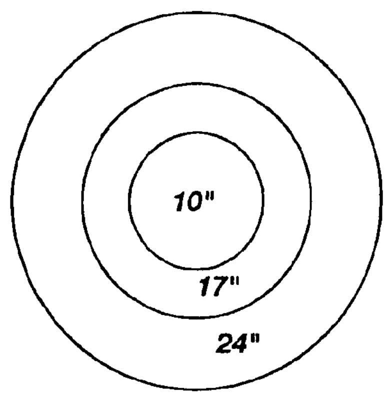
FIG. 19 is a diagram showing different size seed drills.
Figure 20:
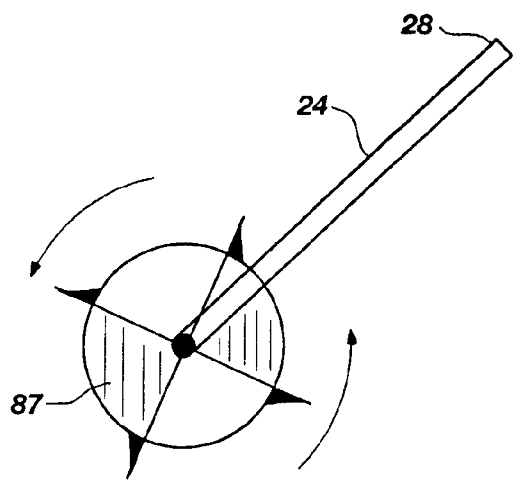
FIG. 20 is a schematic side illustration of a seed drill mounted for rotation on the handle of a machine of FIGS. 1-3.
Figure 21:
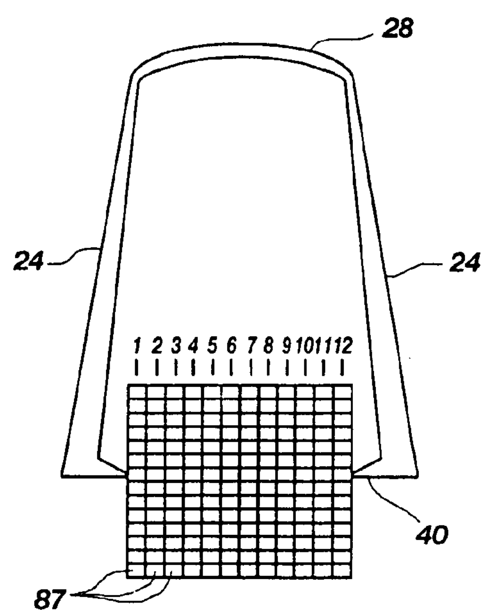
FIG. 21 is a schematic illustration of twelve seed drills mounted side-by-side on the handle of the machine of FIGS. 1-3.

FIGS. 15-21 show embodiments of a cylindrical or disk shaped seed drill of the invention which are usable as an implement with the garden machine of the invention. As shown in FIGS. 15 and 16, spade heads 86 are arranged to extend from a hollow disk shaped body 87 and to penetrate into the ground and deposit one or more seeds into the ground as the disk shaped body rotates. An elongate door 88 or a round door 89 is provided to open into the hollow body so that seeds and/or fertilizer can be placed in the hollow body. FIGS. 15 and 16 show a four spade embodiment of seed drill. The seed drill of FIG. 15 has a central opening 90 to fit onto a shaft 40 and has a keyway 91 so that the seed drill can be locked to the shaft with a separate key such as key 74 of FIG. 8. FIG. 18 shows an eight spade embodiment of seed drill with hollow body 92 and eight spades 93 projecting outwardly therefrom. Body 92 has a central opening 94 for mounting on a shaft 40 and includes a built in key 95 to mate with keyway 50 in shaft 40. Each of the spades work in similar fashion and is spring loaded in the body 87 or 92. As shown in FIG. 17, which will be described in relation to the seed drill of FIGS. 15 and 16, but will be the same for the seed drill of FIG. 18, each spade head 86 is mounted on the end of a shaft 100 that extends through a seed discharge opening 102. The opposite end of shaft 100 is secured to a plug 104. A spring 106 pushes against a nipple 108 which abuts and pushes against plug 104 to which shaft 100 and spade head 86 is attached to bias them all outwardly. When the spade head 86 is out of the ground (as at the top of FIG. 17), the spring 106 biases the nipple 108 and shaft 100 outwardly so that plug 104 abuts the inside of the disk wall 110 and stops outward movement of shaft 100 and spade head 86 and plugs seed discharge opening 102. When the spade head 86 is against and driven into the ground by the weigh of the machine (at the bottom of FIG. 17), the spade head 86 moves inwardly against the bias of spring 106 toward disk wall 110 and moves plug 104 from over the seed discharge opening 102 to allow one or more seeds from inside the disk, which is seed reservoir 112, to fall into the seed discharge opening 102. As the spade head 86 moves away from the disk wall 110 as the disk continues to rotate and pull the spade head 86 out of the ground, the seed or seeds in the seed discharge opening 102 fall into the furrow or hole just made for them in the soil by spade head 86. FIG. 19 shows how different diameters of seed drills can be used to provide various seed spacings in the ground. FIG. 19 shows seed drill diameters of ten, seventeen, and twenty four inches and the difference in circumferences of such seed drills. With the same number of spade heads, such as four or eight spade heads on each seed drill, the larger the circumference, the larger the distance between each successive seed planted by the seed drill. FIG. 20 shows how such a seed drill 87 will rotate when mounted on a shaft 40 pushed by handle 28 through front upwardly extending frame members 24 in the embodiment of FIGS. 1-3. FIG. 21 shows how twelve separate seed drill disks 87 can be mounted together in side-by-side configuration on the shaft 40 of the garden machine of FIGS. 1-3 to form a thirty inch wide composite seed drill with each individual seed drill 87 being about two and one half inches wide. FIGS. 20 and 21 show only the handle 28 and front upwardly extending frame members 24 of the embodiment of FIGS. 1-3.

Figure 22:
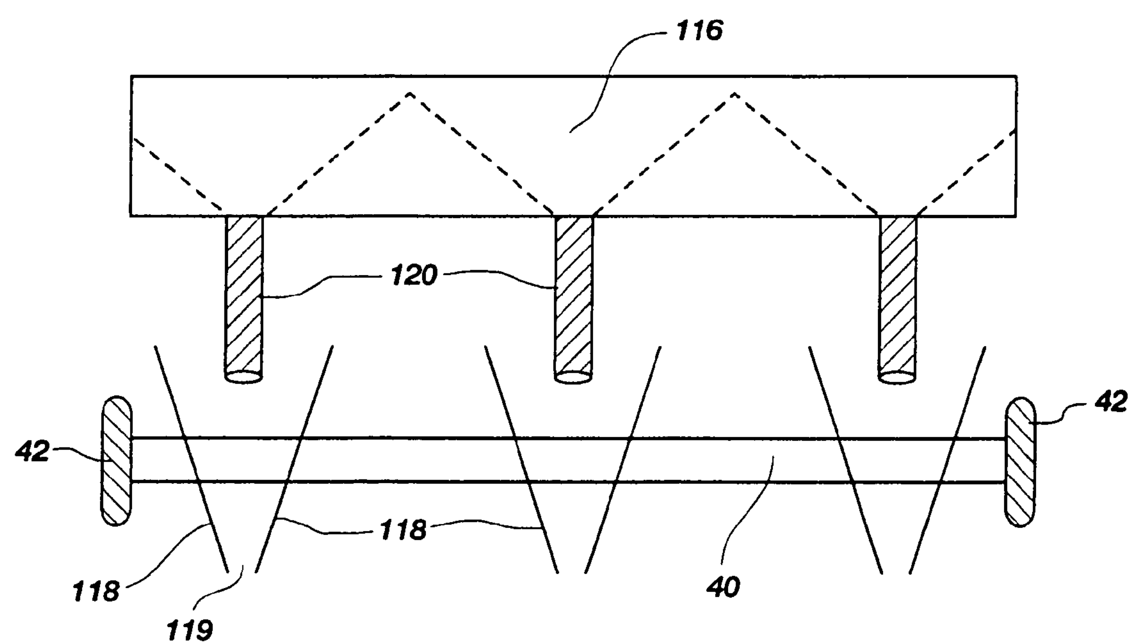
FIG. 22 is a front elevation of the front of a machine of the invention with harrow blades and a second embodiment of seed drill.

Rather than planting seeds with the seed drill disks of FIGS. 15-21, a seed hopper 116 can be positioned at the front of the garden machine above implement mounting shaft 40 mounted by bearing blocks 42. The remainder of the garden machine is not shown. As shown in FIG. 22, tiller or harrow disks 118 are arranged on shaft 40 in a V orientation so as to create a V shape furrow 119 in the ground as the garden machine is moved over the ground. Seed feed tubes 120, which may be flexible, communicate with seed hopper 116 so that seeds feed from seed hopper through seed feed tubes 120 into the furrows 119 created by the tiller or harrow disks 118.

As shown in FIGS. 1-3, the garden machine of the invention can be a manually powered machine where a user grasping handles 28 and/or 32 can push or pull the machine over the ground so that the implements mounted on shaft 40 dig into and work the ground. Depending upon the implements used, the machine can rest on both the implements and wheels 38 as it is pushed or pulled over the ground or the rear wheels 38 can be lifted off the ground so that the machine is supported by only the implements as it is pushed or pulled over the ground. When the machine is moved over the ground between jobs so that it is not desirable to have the implements contact the ground, the handle is pushed down so that the machine is supported entirely by the rear wheels 38.

Figure 23:
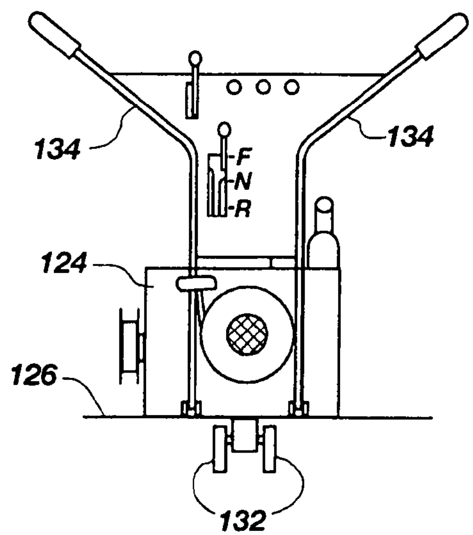
FIG. 23 is a rear view of a motor driven garden machine of the invention without the implements showing at the front of the machine, showing the wheels at the rear of the machine and the handle and controls.
Figure 24:
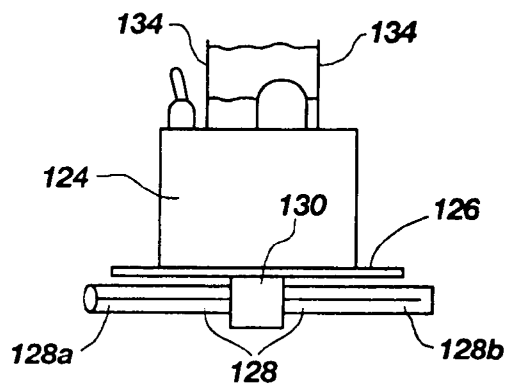
FIG. 24 is a front view of the motor driven garden machine of FIG. 23 showing the implement shaft.

Rather than being a manual machine where a user has to pull or push the machine to operated the implements, the machine of the invention can also be powered by either a gas engine or an electric motor. FIGS. 23 and 24 show a powered embodiment of the garden machine of the invention where a gasoline engine 124 mounted on an engine platform 126 forming part of the frame is coupled to the implement mounting shaft 128 to turn the shaft along with the implements, not shown in FIGS. 23 and 24, mounted on the shaft. This embodiment is shown with a center shaft drive or gear box 130, FIG. 24, with the implement mounting shaft 128 extending outwardly at opposite sides of the center drive 130 in cantilever manner to create two oppositely extending shaft sections 128*a* and 128*b*. Implements are mounted on the shaft from the opposite shaft ends, rather than by removal of the shaft from the frame as shown with the frame arrangement for the manual machine of FIGS. 1-3. A set of small rear wheels 132, FIG. 23, are provided to support the machine when desired. The gasoline engine used can be a five horse power, a seven horse power, or any other satisfactory engine. The engine can be arranged to drive just the shaft 128 with implements attached, or it can be arranged to also drive the wheels 132 so the machine is self propelled. If desired, the engine could be arranged in the machine to just drive the wheels 132 and not the shaft 128 with the implements. In FIG. 23, the wheels are shown as small diameter wheels under the frame. However, the wheels can be of any desired diameter and placed at the side of the frame to accommodate a larger diameter, if desired.

Figure 25:
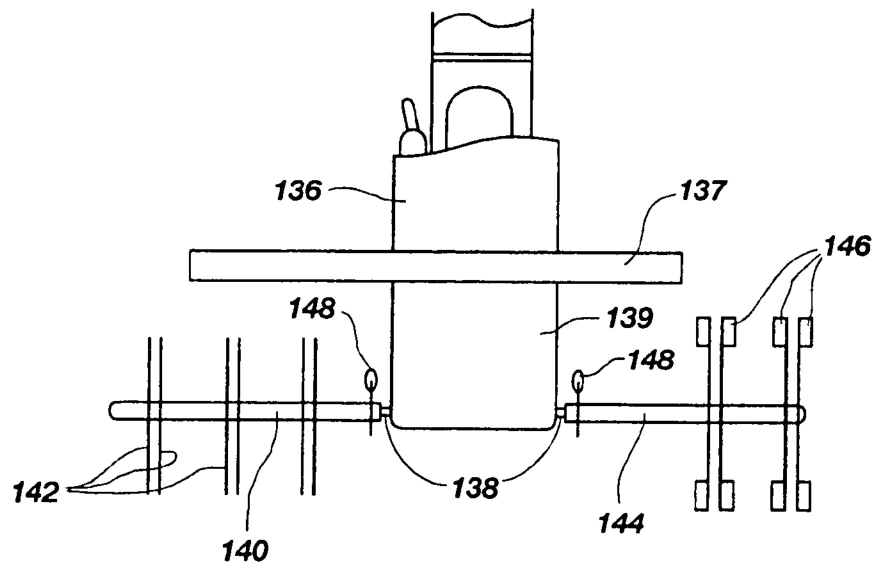
FIG. 25 is a front view of a motor driven garden machine with implements mounted on the implement shaft.

FIG. 23 shows the handle 134 extending from the engine platform 126 with the various machine controls for forward rotation of the shaft, reward rotation of the shaft, and neutral, as well as a speed control. FIG. 25 shows a similar powered machine with gasoline engine 136 mounted on platform 137 with implement mounting shaft 138 extending from opposite sides of a center gearbox 139. A sleeve 140 with disks 142 mounted thereon is mounted over one section of shaft 138 extending from one side of gearbox 139 and sleeve 144 with tiller blades 146 is mounted on the oppositely extending shaft section 138. Half length shaft sleeves fit on the half length shaft portions extending from the center gear box 139. The sleeves, and thereby the implements, are held on the shaft sections by cotter pins or spring clips 148 at the inner ends of the sleeves which pass through the sleeves and shaft sections. With different implements on each side of the machine, different jobs can be done on each side simultaneously. The engine can drive the implement mounting shaft and/or wheels by belt drive, chain drive, or gear drive. The gear box could be provided so that each side of the shaft can be driven differently. Further, implements can be attached to only one side of the shaft of the machine if it is desired to work on only a narrow strip of ground.

The garden machine of the invention allows a user to perform various gardening functions with a single machine by allowing the user to easily interchange implements placed on the implement mounting shaft. The user does not have to obtain different machines for each gardening task to be performed. Where the shaft is removable from the machine to change the implements and is mounted to the machine at its ends, the machine mounting the shaft at the ends of the shaft will hold the implements and any spacers used on the shaft. Where the implements are put onto the shaft from an open end of the shaft, the implements have to be held on the shaft by a lock at the open end of the shaft or at some other location on the shaft. Where implements are mounted on the shaft in side-by-side abutting relationship, the implements may interlock such as by projections on one implement that are received in indentations in the adjacent implement.

Whereas the invention is here illustrated and described with reference to embodiments thereof presently contemplated as the best mode of carrying out the invention in actual practice, it is to be understood that various changes may be made in adapting the invention to different embodiments without departing from the broader inventive concepts disclosed herein and comprehended by the claims that follow.

What is claimed is:

1. A garden machine, comprising:

a frame;

wheels mounted for rotation on the frame;

a shaft mounted to the frame;

at least one implement removably mounted on the shaft for rotation with the shaft and so that the implement may be removed from the shaft by a user;

a handle by which the frame can be held and manipulated by a user; and wherein the at least one implement is a disk shaped seed drill having seed discharge tubes positioned around the circumference of the disk shaped seed drill cooperable with a spring loaded planting head extending from a circumferential wall of the disk shaped seed drill and having a seed discharge opening communicating through a displacement operated valve with a seed reservoir in the disk shaped seed drill to allow a seed from the seed reservoir to flow through the seed discharge tube into the ground upon a preset displacement of the planting head toward the circumferential wall of the disk shaped seed drill against the bias of the spring load.

2. A garden machine according to claim 1, additionally including a power source coupled to the shaft to rotate the shaft.

3. A garden machine according to claim 2, wherein the power source is also coupled to the wheels to rotate the wheels.

4. A garden machine according to claim 2, wherein the shaft is mounted to the frame intermediate the shaft with ends of the shaft extending from the mounting in cantilever fashion.

5. A garden machine according to claim 4, wherein the at least one implement is a plurality of implements.

6. A garden machine according to claim 5, wherein the plurality of implements is at least one implement mounted on each end of the shaft extending from the mounting of the shaft.

7. A garden machine according to claim 1, wherein the shaft is removably mounted to the frame to allow removal of the at least one implement.

8. A garden machine, comprising:

a frame;

a shaft mounted to the frame;

at least one implement mounted on the shaft;

a handle by which the frame can be held and manipulated by a user; and wherein the at least one implement is a disk shaped seed drill having seed discharge tubes positioned around the circumference of the disk shaped seed drill cooperable with a spring loaded planting head extending from a circumferential wall of the disk shaped seed drill and having a seed discharge opening communicating through a displacement operated valve with a seed reservoir in the disk shaped seed drill to allow a seed from the seed reservoir to flow through the seed discharge tube into the ground upon a preset displacement of the planting head toward the circumferential wall of the disk shaped seed drill against the bias of the spring load.

9. A garden machine according to claim 8, additionally including a power source coupled to the shaft to rotate the shaft.

10. A garden machine according to claim 9, wherein the power source is also coupled to the wheels to rotate the wheels.

11. A garden machine according to claim 8, wherein the shaft is mounted to the frame intermediate the shaft with ends of the shaft extending from the mounting in cantilever fashion.

12. A garden machine according to claim 11, wherein the at least one implement is a plurality of implements and wherein the plurality of implements is at least one implement mounted on each end of the shaft extending from the mounting of the shaft.

13. A garden machine according to claim 8, wherein the at least one implement is a plurality of implements.

14. A garden machine according to claim 8, wherein the shaft is removably mounted to the frame to allow removal of the at least one implement.

* * * * *